(No Model.)
J. J. MOORE.
STAKE FOR GUY ROPES.
No. 292,129. Patented Jan. 15, 1884.
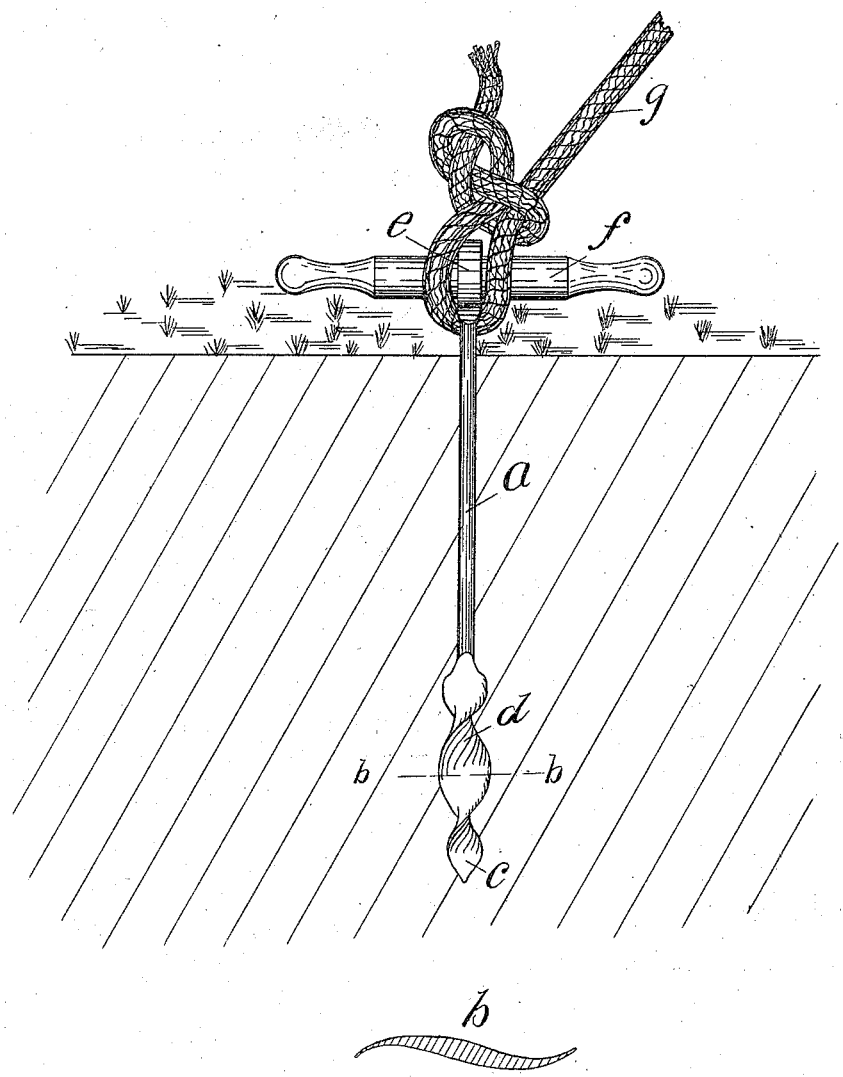
WITNESSES:
H. P. Hood.
E. E. Sickler.
INVENTOR:
Jonathan J. Moore

UNITED STATES PATENT OFFICE.

JONATHAN J. MOORE, OF THORNTOWN, INDIANA, ASSIGNOR OF ONE-HALF TO JAMES A. BALL, OF SAME PLACE.

STAKE FOR GUY-ROPES.

SPECIFICATION forming part of Letters Patent No. 292,129, dated January 15, 1884.

Application filed June 29, 1883. (No model.)

*To all whom it may concern:*

Be it known that I, JONATHAN J. MOORE, a citizen of the United States, residing at Thorntown, in the county of Boone and State of Indiana, have invented a new and useful Improved Stake for Guy-Ropes, of which the following is a specification.

My invention relates to an improved stake for making fast to the earth the guy-ropes of derricks, and is designed more particularly for use with the derricks of straw-stacking machines.

The object of my improvement is to provide a stake which will hold strongly, be durable, and which may be quickly driven into or removed from the earth without the use of a hammer.

The accompanying drawing illustrates my invention.

$a$ is a bar of round iron, having a portion of one end first beaten out flat, said flat portion having its edges drawn down thin and its center left thicker, as shown in the section $b$. The extreme end of said flattened portion is then tapered to a point, as shown at $c$, and the whole flattened portion twisted to form a screw-blade, $d$, which differs from an auger in that it will enter the earth when turned from left to right on its longitudinal axis, and will not raise or displace the earth except laterally to the width and thickness of section $b$.

The opposite end of bar $a$ is turned to form an eye, $e$, through which the handle $f$ is passed. Said handle serves the purpose of a lever to turn the stake into or out of the earth, and also as a belaying-pin to fasten the guy-rope $g$ to.

In use the point $c$ is placed on the earth, and a few turns of the stake serve to draw it into the earth nearly to the handle, and it is easily and quickly removed by turning in the opposite direction.

I claim as my invention—

1. A stake consisting of a cylindrical bar having a screw-blade formed thereon, with thin edges, and terminating in a tapered point, and adapted to enter the earth without raising it, substantially as shown and described, and for the purpose specified.

2. A stake consisting of a cylindrical bar having a screw-blade formed thereon, with thin edges, and terminating in a taper point, and adapted to enter the earth without raising it, an eye formed on said bar, and a handle inserted in said eye, all combined, substantially as and for the purpose specified.

JONATHAN J. MOORE.

Witnesses:
H. P. HOOD,
E. E. SIEKLER.